C. McSHERRY.
METAL WORKING TOOL.
APPLICATION FILED AUG. 17, 1906.

905,909.

Patented Dec. 8, 1908.

WITNESSES
Warren W. Swartz
R. A. Balderson

INVENTOR
Charles McSherry
by Bakewell Byrnes
his attys

UNITED STATES PATENT OFFICE.

CHARLES McSHERRY, OF PITTSBURG, PENNSYLVANIA.

METAL-WORKING TOOL.

No. 905,909.        Specification of Letters Patent.        Patented Dec. 8, 1908.

Application filed August 17, 1906. Serial No. 331,009.

*To all whom it may concern:*

Be it known that I, CHARLES McSHERRY, of Pittsburg, Allegheny county, Pennsylvania, have invented a new and useful Metal-Working Tool, of which the following is a full, clear, and exact description, reference being had to the accompanying drawings, forming part of this specification, in which—

Figure 1:
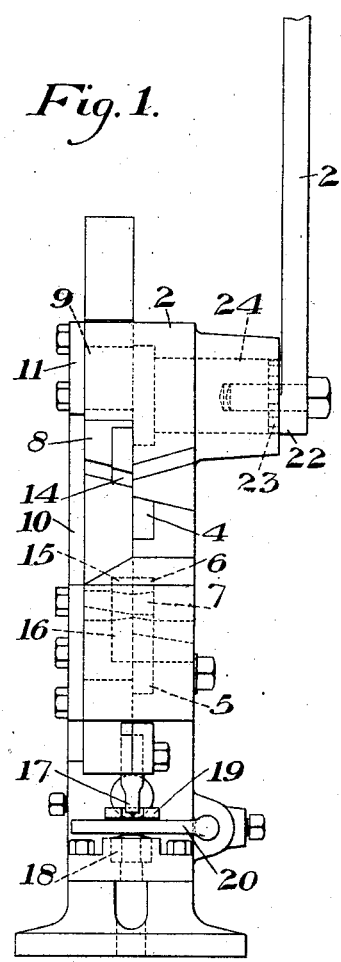
Figure 2:
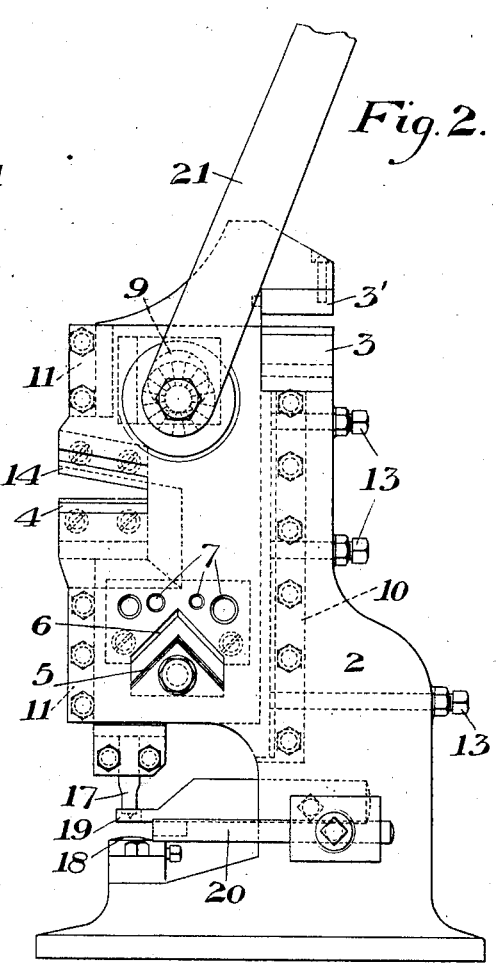
Figure 3:
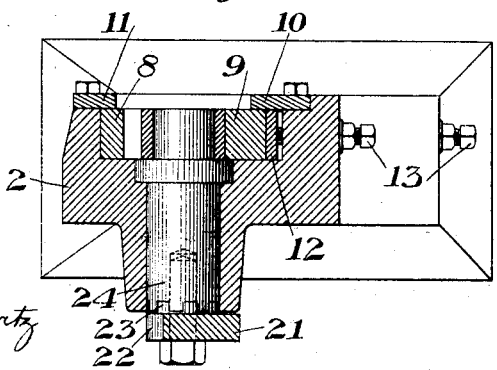

Figures 1 and 2 are respectively front and side elevations of my improved machine; and Fig. 3 is a cross-section partly in elevation on the plane of the eccentric.

My invention relates to the shearing, bending and punching of metal, and is designed to provide a simple, cheap and light machine which with a single slide or shear blade will carry out any one of a number of operations.

In the drawings, in which I show a preferred form of my invention, 2 represents a stationary casting, which is apertured and provided with the fixed members of the different tools. In the form shown, it is cut away at the back near its top to receive the stationary bending die 3. At the front it is cut away to receive the stationary removable shear blade 4, also the stationary removable angle shear blade 5 and the removable steel block 6, containing holes of different diameters shown at 7 acting as stationary shear blades for rods.

The frame is recessed on one side to receive the movable shear blade member 8. This member is cut through in its upper portion to receive the box of the eccentric device 9 by which it is reciprocated vertically. The movable member is shown as being held by the clamping plates 10 and 11, and wear may be taken up by the liner 12 adjusted by the cap bolts 13. The vertically movable shear blade member carries the bending die 3', the shear blade 14 which coacts with stationary shear blade 4, the removable shear block 15 having the holes which in one position register with the holes 7 for cutting off of rods; also movable shear blade 16 of angle form to coöperate with the stationary angle plate 5. To the lower portion of this shear blade is also removably secured the punch 17 which enters a suitable hole in the removable anvil block 18 set in the base of the press. 19 is a stripper, and 20 an adjustable gage to set the position of the hole in the strip being punched. In the form shown, the operating handle 21 is provided with a hub 22 having teeth 23 engaging suitable recesses in the shaft 24 of the eccentric.

The advantages of my invention result from the simplicity and cheapness of the device, and the number of operations which may be carried out upon it. By changing the dies 3 and 3' different forms may be bent from hoop iron or band material, plates or strips may be sheared between the shear blades 14 and 4; rods of different sizes may be sheared, as well as angles. Metal may also be punched with different sizes of holes. Inasmuch as a single vertically movable slide is employed, the device is very compact and strong.

Changes may be made in the form and arrangement of tools, the number of dies, &c., without departing from my invention.

I claim:—

1. A metal working tool comprising a stationary frame having opposite side portions thereof cut away and provided respectively with stationary bending, cutting and angle-shearing dies, and a slide mounted to reciprocate in said frame and having bending, cutting and angle-shearing tools which coöperate respectively with the fixed dies of the frame, substantially as described.

2. A metal working tool comprising a stationary frame having opposite side portions thereof cut away and provided with stationary bending and shearing dies, holes in said frame of various size, a slide mounted to reciprocate in said frame and having bending and shearing dies which coöperate respectively with the fixed dies of the frame, and holes in the slide coöperating with the holes of the frame, substantially as described.

3. A metal working tool comprising a stationary frame having opposite side portions thereof cut away and provided respectively with stationary bending, cutting and angle-shearing dies, holes of various size in said frame, and a slide mounted to reciprocate in said frame and having bending, cutting and angle-shearing tools which cooperate respectively with the fixed dies of the frame, holes in said slide coöperating with the holes in said frame, and a punch at the lower end of the slide and coöperating with an anvil on the frame, substantially as described.

In testimony whereof, I have hereunto set my hand.

CHAS. McSHERRY.

Witnesses:
   Geo. B. Bleming,
   Geo. H. Parmelee.